United States Patent
Nakagawa

(10) Patent No.: US 9,731,559 B2
(45) Date of Patent: Aug. 15, 2017

(54) PNEUMATIC MOTORCYCLE TIRE

(71) Applicant: BRIDGESTONE CORPORATION, Chuo-ku, Tokyo (JP)

(72) Inventor: Hidemitsu Nakagawa, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 250 days.

(21) Appl. No.: 14/377,921

(22) PCT Filed: Feb. 6, 2013

(86) PCT No.: PCT/JP2013/052689
§ 371 (c)(1),
(2) Date: Aug. 11, 2014

(87) PCT Pub. No.: WO2013/121946
PCT Pub. Date: Aug. 22, 2013

(65) Prior Publication Data
US 2015/0041033 A1    Feb. 12, 2015

(30) Foreign Application Priority Data

Feb. 13, 2012  (JP) ................................. 2012-028549

(51) Int. Cl.
*B60C 11/03* (2006.01)
*B60C 11/117* (2006.01)

(52) U.S. Cl.
CPC ........ *B60C 11/0327* (2013.01); *B60C 11/032* (2013.04); *B60C 11/0302* (2013.04);
(Continued)

(58) Field of Classification Search
CPC  B60C 11/032; B60C 11/0304; B60C 11/0302
See application file for complete search history.

(56) References Cited

U.S. PATENT DOCUMENTS 4,364,426 A    12/1982  Mills et al.
6,206,064 B1    3/2001  Takahashi
(Continued)

FOREIGN PATENT DOCUMENTS

CN    101175650 A    5/2008
CN    203157612 U    8/2013
(Continued)

OTHER PUBLICATIONS

Communication dated Oct. 28, 2015 from the European Patent Office issued in corresponding Application No. 13749219.5.
(Continued)

*Primary Examiner* — Steven D Maki
(74) *Attorney, Agent, or Firm* — Sughrue Mion, PLLC

(57) ABSTRACT

Provided is a pneumatic motorcycle tire which includes a tread portion, and side wall portions and bead portions, and whose rotation direction when the tire is mounted on a vehicle is designated. A tire tread includes a branched main groove composed of a first groove extending inclined toward the designated tire rotation direction on one side in the tire width direction, a second groove extending from an end portion of the first groove in the reverse rotation direction of the designated tire rotation direction inclined toward the designated tire rotation direction on the other end in the tire width direction, and a third groove extending from an end portion of the first groove and second groove in the reverse rotation direction of the designated tire rotation direction toward the reverse rotation direction of the designated tire rotation direction, wherein a connecting portion of the first groove and the second groove is formed in a curved shape, the first groove and the second groove are formed in a curved line having the center of the radius of curvature on the side of the reverse rotation direction of the designated tire rotation direction, and the third groove is formed in a
(Continued)

curved line having the center of the radius of curvature on the side of the tire center portion.

4 Claims, 1 Drawing Sheet

(52) U.S. Cl.
CPC ... *B60C 11/0304* (2013.04); *B60C 2011/0339* (2013.04); *B60C 2011/0381* (2013.04); *B60C 2200/10* (2013.04)

(56) References Cited

U.S. PATENT DOCUMENTS

| | | | | |
|---|---|---|---|---|
| D554,045 S | * | 10/2007 | Kasai | D12/535 |
| D554,046 S | * | 10/2007 | Matsunami | D12/535 |
| 2009/0078349 A1 | | 3/2009 | Nakagawa | |
| 2012/0241060 A1 | * | 9/2012 | Hayashi | B60C 11/0302 152/209.8 |
| 2013/0014869 A1 | * | 1/2013 | Makioka | B60C 11/0302 152/209.11 |
| 2013/0240099 A1 | * | 9/2013 | Kuwahara | B60C 11/0302 152/209.8 |

FOREIGN PATENT DOCUMENTS

| | | |
|---|---|---|
| EP | 0861740 A2 | 9/1998 |
| JP | S57167801 A | 10/1982 |
| JP | 03-135802 A | 6/1991 |
| JP | 2001-030719 A | 2/2001 |
| JP | 2001-039120 A | 2/2001 |
| JP | 2007-045239 A | 2/2007 |
| WO | 2006/123480 A1 | 11/2006 |
| WO | 2011/068173 A1 | 6/2011 |
| WO | WO-2011/068173 A1 * | 6/2011 |
| WO | 2011/118186 A1 | 9/2011 |
| WO | WO-2011/118186 A1 * | 9/2011 |
| WO | 2013/003915 A1 | 1/2013 |

OTHER PUBLICATIONS

Communication dated Dec. 22, 2014 from the State Intellectual Property Office of P.R. China in counterpart application No. 201310049879.4.

International Search Report for PCT/JP2013/052689 dated Mar. 26, 2013.

* cited by examiner

PNEUMATIC MOTORCYCLE TIRE

TECHNICAL FIELD

The present invention relates to a pneumatic motorcycle tire (hereinafter, also simply referred to as "tire"), and particularly, to a pneumatic motorcycle tire in which an arrangement condition of a groove which is formed on the surface of a tread portion is improved.

BACKGROUND ART

Since a front tire for motorcycle functions as a steering wheel which controls a body of the motorcycle in accordance with steering of a handlebar, in order for a rider to travel stably and comfortably, the front tire needs to have flexible properties such that the handlebar can be operated with agility in accordance with the rider's will.

A pneumatic motorcycle tire has properties that the body of the motorcycle is inclined by turning the handlebar and turns in a balance with a turning force of the tire after a camber angle (CA) is applied. Therefore, in order for a front tire for two-wheeled vehicles to turn smoothly, the tire needs to be set so that a handlebar is steered with moderate agility by moderately reducing the pattern rigidity near the tire center. For this reason, a method in which the pattern rigidity is moderately reduced by arranging a circumferential direction groove on a center portion or the like to reduce the torsional rigidity of a tread has been employed for a front tire.

Examples of a technique for improving a tread pattern of a pneumatic motorcycle tire include a technique disclosed in Patent Document 1. Such a technique disclosed in Patent Document 1 is for the purpose of attaining both wet drainability and straightforward handling.

RELATED ART DOCUMENT

Patent Document

Patent Document 1: Japanese Unexamined Patent Application Publication No. 2001-39120 (Claims and the like)

SUMMARY OF THE INVENTION

Problems to be Solved by the Invention

However, when the pattern rigidity of a tire center portion is reduced, the wear performance of a tire deteriorates and the lateral rigidity also deteriorates, which causes deterioration of turning force or the like. Therefore, particularly in a tire for two-wheeled vehicles in which an importance is placed on the motion performance, it has been an object to attain the operability with agility and both wear performance and turning force.

Accordingly, an object of the present invention is to provide a pneumatic motorcycle tire in which economic efficiency and stability are attained by providing a technique for improving the agility of a front tire for motorcycle without compromising other performances such as wear performance, taking into account characteristics of the above-described tire for two-wheeled vehicles.

Means for Solving the Problems

The present inventor intensively studied to find that the above-described problems can be resolved by arranging a branched main groove on a tire tread and defining the shape of the branched portion as a predetermined shape, thereby completing the present invention.

Specifically, the present invention is a pneumatic motorcycle tire which comprises a tread portion, and side wall portions and bead portions extending from both sides of the tread portion, and whose rotation direction when the tire is mounted on a vehicle is designated, wherein a tire tread comprises a branched main groove composed of a first groove extending inclined toward the designated tire rotation direction on one side in the tire width direction, a second groove extending from an end portion of the first groove in the reverse rotation direction of the designated tire rotation direction inclined toward the designated tire rotation direction on the other end in the tire width direction, and a third groove extending from an end portion of the first groove and second groove in the reverse rotation direction of the designated tire rotation direction toward the reverse rotation direction of the designated tire rotation direction, wherein a connecting portion of the first groove and the second groove is formed in a curved shape, the first groove and the second groove are formed in a curved line having the center of the radius of curvature on the side of the reverse rotation direction of the designated tire rotation direction, and the third groove is formed in a curved line having the center of the radius of curvature on the side of the tire center portion.

In the present invention, the center of the branched portion of the main groove is preferably separated from tire center portion in the tire width direction. Further, in the present invention, the connecting portion of the first groove and the third groove, and the connecting portion of the third groove and the second groove are preferably formed in a curved shape.

Further, in the present invention, letting the radius of curvature of the connecting portion of the first groove and the second groove be $R_A$, the radius of curvature of the connecting portion of the first groove and the third groove be $R_B$, and the radius of curvature of the connecting portion of the third groove and the second groove be $R_C$, the relationship of $R_A > R_B$ and $R_A > R_C$ is preferably satisfied. Still further, in the present invention, preferably, the radius of curvature $R_A$ of the connecting portion of the first groove and the second groove is in a range of 12 to 18 mm, the radius of curvature $R_B$ of the connecting portion of the first groove and the third groove is in a range of 4 to 8 mm, and the radius of curvature $R_C$ of the connecting portion of the third groove and the second groove is in a range of 6 to 10 mm.

Effects of the Invention

According to the present invention, by employing the above-described constitution, a pneumatic motorcycle tire in which both economic efficiency and stability are attained by improving the agility without compromising other performances such as wear performance can be attained.

MODE FOR CARRYING OUT THE INVENTION

In the following, an embodiment of the present invention will be described in detail with reference to the Drawings.

Figure 1:
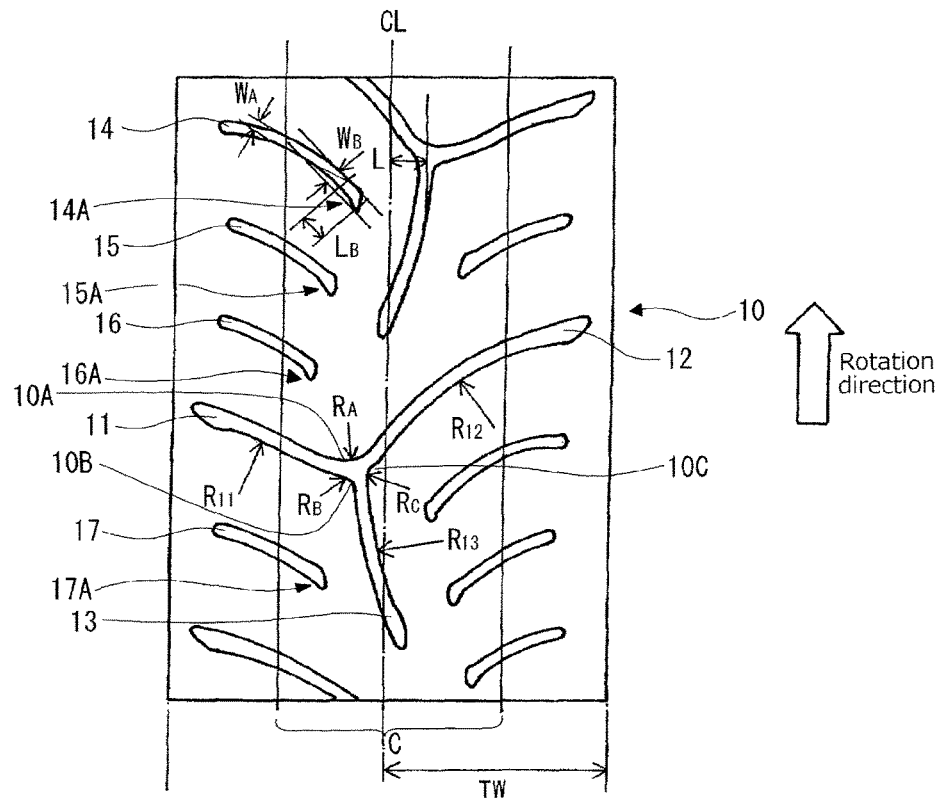
FIG. 1 is a partial development view illustrating a tread of one example of a pneumatic motorcycle tire of the present invention.
Figure 2:
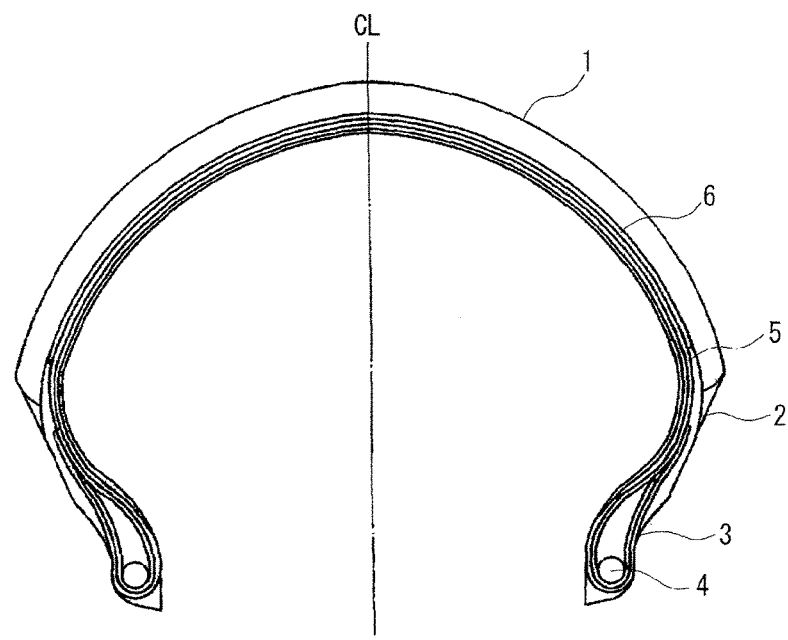
FIG. 2 is a schematic cross section illustrating one example of a pneumatic motorcycle tire of the present invention.

FIG. 1 is a partial development view illustrating a tread of one example of a pneumatic motorcycle tire of the present invention. FIG. 2 is a schematic cross section illustrating one example of a pneumatic motorcycle tire of the present invention. As illustrated in FIGS. 1, 2, the pneumatic motorcycle tire of the present invention comprises a tread portion 1, and side wall portion 2 and bead portion 3 extending from both sides of the tread portion, and is one having a so-called directional pattern in which the rotation direction when mounted on a vehicle is designated. An arrow sign in FIG. 1 represents the rotation direction (designated rotation direction) when the tire is mounted on a vehicle.

In the present invention, as illustrated in FIG. 1, a tire tread is provided with a branched main groove 10 composed of first to third grooves. Such a main groove 10 is composed of a first groove 11 extending inclined toward the designated tire rotation direction on one side in the tire width direction, a second groove 12 extending from an end portion of the first groove 11 in the reverse rotation direction of the designated tire rotation direction inclined toward the designated tire rotation direction on the other end in the tire width direction, and a third groove 13 extending from an end portion of the first groove 11 and second groove 12 in the reverse rotation direction of the designated tire rotation direction toward the reverse rotation direction of the designated tire rotation direction. In the present invention, it is important that a connecting portion 10A of the first groove 11 and the second groove 12 be formed in a curved shape.

In the present invention, by arranging the branched main groove 10 related to a tire tread, the torsional rigidity of a tread is reduced without compromising a lateral rigidity needed for a turning force, and both agility and, turning force and wear performance which have conventionally been contradicted are favorably attained, thereby attaining a pneumatic motorcycle tire having both economic efficiency and stability.

Since the pattern rigidity is reduced locally at the branched portion of the three-branched main groove 10, a rider tends to feel uncomfortable during slalom running due to unlinearity of discontinuity of rigidity. However, in the present invention, by forming at least the connecting portion 10A of the first groove 11 and the second groove 12 approximately connected to the tire width direction in a curved shape, the discontinuity of rigidity at the connecting portion 10A can be resolved; therefore particularly an effect of improving handling properties during slalom running demanded for a tire for touring can be obtained.

From a viewpoint of improving the above-described handling performance during slalom running, as illustrated, in addition to the connecting portion 10A of the first groove 11 and the second groove 12, the connecting portion 10B of the first groove 11 and the third groove 13, and the connecting portion 10C of the third groove 13 and the second groove 12 are preferably formed in a curved shape. The above is preferred because, by this, continuity of the rigidity at the branched portion of the main groove 10 can be more improved.

In this case, letting the radius of curvature of the connecting portion 10A of the first groove 11 and the second groove 12 be $R_A$, the radius of curvature of the connecting portion 10B of the first groove 11 and the third groove 13 be $R_B$, and the radius of curvature of the connecting portion 10C of the third groove 13 and the second groove 12 be $R_C$, the relationship of $R_A > R_B$ and $R_A > R_C$ is preferably satisfied for the radius of curvature of these connecting portions. By setting the radius of curvature $R_A$ of the connecting portion 10A of the first groove 11 and the second groove 12 approximately connected to the tire width direction to be large, a rigidity gap in the tire width direction becomes small, thereby obtaining an effect of further improving the continuity of the rigidity at the branched portion.

More specifically, preferably, the radius of curvature $R_A$ of the connecting portion 10A of the first groove 11 and the second groove 12 is set in a range of 12 to 18 mm, the radius of curvature $R_B$ of the connecting portion 10B of the first groove 11 and the third groove 13 is set in a range of 4 to 8 mm, and the radius of curvature $R_C$ of the connecting portion 10C of the third groove 13 and the second groove 12 is set in a range of 6 to 10 mm.

In the present invention, it is needed that the first groove 11 and the second groove 12 are formed in a curved line having the center of the radius of curvature $R_{11}$, $R_{12}$ on the side of the reverse rotation direction of the designated tire rotation direction, and the third groove 13 is formed in a curved line having the center of the radius of curvature $R_{13}$ on the side of the tire center portion. In motorcycles, since a rear tire functions as a driving wheel and a front tire functions as a steering wheel, inputs to the front tire are a braking force and a lateral force. Therefore, in order to effectively attain a turning force, it is needed to arrange a groove in a direction which inhibits the inputs as little as possible, in other word, in a direction along the inputs. From such a viewpoint, the first groove 11 and second groove 12 extending approximately in the tire width direction are formed in a curved line having the center of radius of curvature on the side of the reverse rotation direction of the designated tire rotation direction, in other words, on the back side in the running direction. On the other hand, regarding the third groove 13 extending approximately in the tire circumferential direction, improvement of the grounding property by reducing the flexural rigidity of the center portion is effective for improving the turning force. Therefore, the third groove 13 is formed in a curved line having the center of the radius of curvature on the side of the tire center portion and the flexural rigidity of the connecting portion 10C of the second groove 12 and third groove 13 is reduced, thereby improving the grounding property. As illustrated, the third groove 13 preferably extends inclined with respect to the tire circumferential direction and the end portion in the reverse rotation direction of the designated tire rotation direction extends across the tire center portion. By this, an effect of reducing the torsional rigidity in the tire center portion can be obtained.

Further, in the present invention, the center of the branched portion of the main groove 10 is preferably separated from a tire center portion CL in the tire width direction, and the separation length L from the tire center portion CL to the center of the branched portion suitably satisfies the range of 0.5≤L/TW≤0.25 when the half-width of the tread is defined as TW. Although the torsional rigidity of the branched portion can be effectively reduced by arranging the branched main groove 10, when the center portion of the branched portion is arranged on at the tread center portion, deterioration of initial turning force caused by deterioration of the lateral rigidity becomes notable. Therefore, in order to attain both the above-described agility and initial turning force, the branched portion of the main groove 10 is preferably at a position which satisfies the above range. When L/TW is above 0.25, an effect of improving the agility due to a reduced pattern rigidity is small; when L/TW is below 0.05, deterioration of an initial turning force is notable. The wear performance is hardly influenced by the arrangement of the branched main groove 10.

Still further, in the present invention, a length $L_{11}$ of the first groove 11, a length $L_{12}$ of the second groove 12, and a length $L_{13}$ of the third groove 13 preferably satisfy the relationship of $L_{12} > L_{11}$ and $L_{12} > L_{13}$. In other words, as illustrated, in cases in which the third groove 13 is formed in a curved line having the center of the radius of curvature $R_{13}$ on the side of the tire center portion, by setting the length $L_{12}$ of the second groove 12 extending from the branched portion toward the side where the center of the radius of curvature $R_{13}$ is positioned across the tire center portion CL to be longer than those of the other grooves, the rigidity between the left and the right is uniformly balanced and handling properties during slalom running can be made linear and comfortable, which is preferred. Here, the length of each groove refers to the length measured along each groove.

In the present invention, as illustrated, in addition to the branched main groove 10, a plurality of lug grooves are preferably arranged on the tire tread. In the illustrated example, a plurality of lug grooves 14 to 17 whose inside end portion in the tire width direction terminates within a half area of the tread portion are arranged. In particular, in the present invention, the plurality of lug grooves 14 to 17, in which the inside end portion in the tire width direction is in a tire center region C ranging from the tire equator to a ¼-point which is separated outside by ¼ of the periphery length of the tire tread, preferably includes, at the inside end portion in the tire width direction, widened portions 14A to 17A having a groove width $w_B$ which is larger than a groove width $w_A$ which is the width of the groove other than the inside end portion in the tire width direction. The widening rate $w_B/w_A$ of the widened portions 11A to 14A suitably satisfies the relationship represented by $1.1 \leq w_B/w_A \leq 3$.

By providing widened portions 14A to 17A having the above-described predetermined widening rate $w_B/w_A$ at the inside end portion in the tire width direction of the lug grooves 14 to 17 having the inside end portion in the tire width direction within the tire center region C, the pattern rigidity can be effectively reduced only in the vicinity of the widened portion. By this, the torsional rigidity of a tread is reduced without compromising a lateral rigidity needed for a turning force, and both agility, and turning force and wear performance which have conventionally been contradicted are more favorably attained, thereby attaining a pneumatic motorcycle tire having both economic efficiency and stability.

When the widening rate $w_B/w_A$ of the above-described widened portion is above 3, deterioration of turning force due to deterioration of the pattern rigidity is notable; on the other hand, when the widening rate is below 1.1, the effect of improving the agility is insufficient. The wear performance is hardly influenced by widening the width of only the tip portion of the lug groove. The widening rate $w_B/w_A$ suitably satisfies the relationship represented by $1.3 \leq w_B/w_A \leq 2.5$.

Herein "periphery length" of a tire tread refers to a length measured along the surface of the tread from one tread end to the other tread end in the tire width direction in a state in which the tire is mounted on a rim which is defined by an industrial standard which is effective in a region where the tire is produced and to be used and in which the tire which is inflated to an inner pressure defined in the industrial standard is not loaded. The above-mentioned industrial standard corresponds to JATMA (Japan Automobile Tyre Manufacturers Association, Inc.) YEAR BOOK in Japan, corresponds to ETRTO (European Tyre and Rim Technical Organisation) STANDARD MANUAL in Europe, corresponds to TRA (THE TIRE and RIM ASSOCIATION INC.) YEARBOOK in the United States, and so on.

In the present invention, each of the groove width $w_A$ of a portion of a lug groove excepting the inside end portion in the tire width direction and the groove width $w_B$ of the inside end portion in the tire width direction means the groove width measured in a direction orthogonal to a direction along the lug groove. In the present invention, the widened portion may be provided at the inside end portion of the lug groove in the tire width direction, or provided within the tire center region C, and the length of the widened portion in a direction along the lug groove is not particularly restricted. It is noted that the length $L_B$ of the widened portion in a direction along the lug groove suitably satisfies $0.5 < L_B/w_B < 3$ since, when the length of the widened portion in a direction along the lug groove is too large, the pattern rigidity may deteriorate too much, and on the other hand, when the length is too small, an effect of improving the agility may be insufficient. Further, although the widened portion is provided such that the groove width is increased to the side of the reverse rotation direction of the designated tire rotation direction in an illustrated example, the widened portion may be provided such that the groove width is increased to the side of the designated tire rotation direction or may be provided such that the groove width is increased to the both sides.

In the present invention, a plurality of lug grooves arranged on a tire tread, in which a widened portion is provided at the inside end portion in the tire width direction of the lug groove include the inside end portion in the tire width direction within the tire center region C, can attain the above-described effect, and suitably, as illustrated, a widened portion is provided at all of the plurality of lug grooves arranged on the tire tread. Suitably, all of the inside end portions in the tire width direction of the plurality of lug grooves are within the center region C. By this, both the agility, and the turning force and wear performance can be more highly attained at a higher level.

In the present invention, the arrangement condition of the plurality of lug grooves is not particularly restricted, and preferably, as illustrated, the plurality of lug grooves are arranged asymmetrically alternately in a ratio of 3:1 between both side regions of the tread portion. By arranging lug grooves asymmetrically and alternately while adjusting the ratio between the both side regions, the rigidity between the both side regions of the tread portion can be favorably balanced.

In the present invention, the arrangement pitch of the main grooves, in particular, of the main grooves and lug grooves is not particularly restricted, and may be approximately ⅛ to 1/10 of the total circumferential length of a tire.

In the present invention, only that the above-described conditions relating to a tread pattern are satisfied is important, and by this, an expected effect of the present invention can be obtained. Other details such as the tire structure and material of each member are not particularly restricted.

For example, a tire of the present invention comprises: a carcass 5 which is arranged bridging between a pair of bead cores 4 each embedded in bead portion 3 and reinforces each portions; and a belt 6 which is arranged on the outer periphery thereof and reinforces the tread portion 1. Such a belt 6 may be composed of two or more inclined belt layers which are arranged such that cord directions are crossed with each other between the layers, or may be composed of one or more spiral belt layers in which the cord direction is substantially in the tire circumferential direction. The present invention is useful for a front tire for motorcycle, and can be applied to either a radial structure tire or a bias structure tire.

EXAMPLES

In the following, the present invention will be described in more detail by way of Examples.

In accordance with the conditions listed on the Table below, a front tire for motorcycle having a tire size of MCR120/70ZR17M/C with a tread pattern of a type illustrated in FIG. 1 was manufactured by changing the arrangement conditions of first to third grooves constituting a branched main groove. In Conventional Example, a tire was manufactured such that each connecting portion of first to third grooves was not formed in a curved shape. Regarding a belt, a spiral belt layer whose cord direction is substantially in the tire circumferential direction was arranged as one layer.

Each obtained test tire was mounted on a large-size motorcycle of 1000 cc, and the agility, turning force, and handling performance were evaluated by feeling evaluation in a real vehicle test. As a rear tire, a commercially available tire with a size of MCR180/55ZR17M/C was used. The results were indicated as indices taking 100 as a normal level. For each item, when the value is large, the performance is high, which is preferable. For each performance, a point within ±3 was regarded to be in a tolerance range (in a similar level). The results are listed on the Table below in combination.

TABLE 1

| | Branched groove position (L/TW) | Radius of curvature ($R_A/R_B/R_C$) | Branched groove length ($L_{11}/L_{12}/L_{13}$) | Agility (index) | Turning force (index) | Handling performance (index) |
|---|---|---|---|---|---|---|
| Conventional Example | 0.1 | — | 58/98/62 | 112 | 105 | 93 |
| Example 1 | 0.02 | 15/6/8 | 58/98/62 | 115 | 97 | 102 |
| Example 2 | 0.3 | 15/6/8 | 58/98/62 | 97 | 115 | 105 |
| Example 3 | 0.1 | 15/6/8 | 58/98/62 | 110 | 108 | 108 |
| Example 4 | 0.2 | 15/6/8 | 58/98/62 | 105 | 109 | 110 |
| Example 5 | 0.1 | 8/6/8 | 58/98/62 | 110 | 108 | 98 |
| Example 6 | 0.1 | 15/6/8 | 58/62/62 | 109 | 109 | 97 |
| Example 7 | 0.1 | 15/4/4 | 58/98/62 | 109 | 108 | 98 |

As illustrated in the above Table, in a tire of each Example in which a predetermined branched main groove composed of first to third grooves was arranged on a tire tread, it was confirmed that the agility was improved without compromising the turning force and handling performance.

DESCRIPTION OF SYMBOLS

1 Tread portion
2 Side wall portion
3 Bead portion
4 Bead core
5 Carcass
6 Belt
10 Main groove
10A, 10B, 10C Connecting portion
11 First groove
12 Second groove
13 Third groove
14 to 17 Lug groove
14A to 17A Widened portion

The invention claimed is:

1. A pneumatic motorcycle tire which comprises a tread portion, and side wall portions and bead portions extending from both sides of the tread portion, and whose rotation direction when the tire is mounted on a vehicle is designated, wherein the tire tread comprises a branched main groove composed of a first groove extending inclined toward the designated tire rotation direction on one side in the tire width direction, a second groove extending from an end portion of the first groove in the reverse rotation direction of the designated tire rotation direction inclined toward the designated tire rotation direction on the other side in the tire width direction, and a third groove extending from an end portion of the first groove and second groove in the reverse rotation direction of the designated tire rotation direction toward the reverse rotation direction of the designated tire rotation direction, wherein a connecting portion of the first groove and the second groove is formed in a curved shape, the first groove is formed in a curved line having the center of the radius of curvature on the side of the reverse rotation direction of the designated tire rotation direction, the second groove is formed in a curved line having the center of the radius of curvature on the side of the reverse rotation direction of the designated tire rotation direction, and the third groove is formed in a curved line having the center of the radius of curvature on the side of the tire center portion;

wherein the connecting portion of the first groove and the third groove, and the connecting portion of the third groove and the second groove are further formed in a curved shape;

wherein, letting the radius of curvature of the connecting portion of the first groove and the second groove be $R_A$, the radius of curvature of the connecting portion of the first groove and the third groove be $R_B$, and the radius of curvature of the connecting portion of the third and the second groove be $R_C$, the relationship of $R_A > R_B$ and $R_A > R_C$ is satisfied.

2. The pneumatic motorcycle tire according to claim 1, wherein the center of the branched portion of the main groove is separated from tire center portion in the tire width direction.

3. The pneumatic motorcycle tire according to claim 1, wherein the radius of curvature $R_A$ of the connecting portion of the first groove and the second groove is in a range of 12 to 18 mm, the radius of curvature $R_B$ of the connecting portion of the first groove and the third groove is in a range of 4 to 8 mm, and the radius of curvature $R_C$ of the connecting portion of the third groove and the second groove is in a range of 6 to 10 mm.

4. The pneumatic motorcycle tire according to claim 1, wherein the third groove extends inclined in approximately the tire circumferential direction and the end portion of the third groove in the reverse rotation direction of the designated tire rotation direction extends across the tire center portion.

\* \* \* \* \*